UNITED STATES PATENT OFFICE.

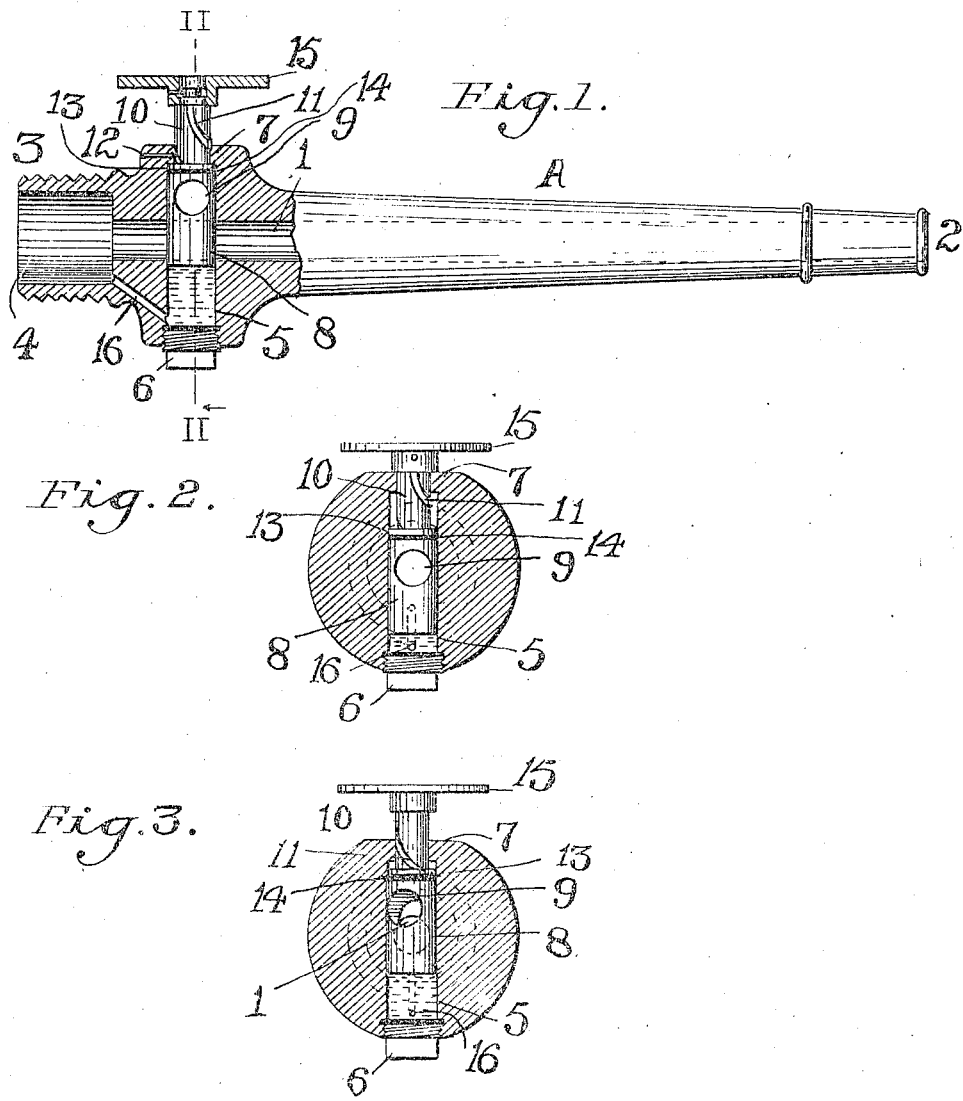

WILLIAM O'BRIEN AND FREDERICK W. WADDELL, OF PITTSBURGH, PENNSYLVANIA.

HOSE-NOZZLE.

1,059,753.  Specification of Letters Patent.  Patented Apr. 22, 1913.

Application filed October 1, 1912. Serial No. 723,298.

*To all whom it may concern:*

Be it known that we, WILLIAM O'BRIEN and FREDERICK W. WADDELL, citizens of the United States, and residing in the city of Pittsburgh, in the county of Allegheny and State of Pennsylvania, have invented or discovered new and useful Improvements in Hose-Nozzles, of which the following is a specification.

Our invention consists in new and useful improvements in hose-nozzles, combining in one device the function of a washer, from which the stream is allowed to escape at full pressure, with that of a sprayer.

The nozzle is normally and automatically shut off by the water-pressure and is opened against the latter by finger-pressure, the passage of the water through the bore of the nozzle being controlled and regulated by means which move in both a longitudinal and rotary direction.

Novel features of structure and arrangement of parts will appear from the following description.

In the accompanying drawings, Figure 1 is a side elevation of our improved nozzle, the valve portion being broken away in section to show the parts and the plug being shown elevated to close or shut off the nozzle; Fig. 2 is a vertical section along the line II—II in Fig. 1, the plug being shown depressed to open the nozzle bore to its full extent, and Fig. 3 is a similar view showing the plug but partially depressed to form a spray.

The following is a detailed description of the drawings.

A is the nozzle having a longitudinal water passage or bore 1, a discharge end 2 and a butt 3, the bore of the nozzle at the butt being expanded as at 4. The diameter of the nozzle adjacent to the bore is enlarged and provided with a diametric valve seat 5 which is closed at one end by means of a screw-plug 6. The upper end of said seat 5 is contracted circumferentially by the internal flange 7.

8 is a valve plug fitting in seat 5 and adapted to both reciprocate and rotate therein. Said plug is provided with a diametric port 9 of equal capacity to bore 1, and adapted to register with said bore when said plug is properly positioned.

The plug 8 is inserted in seat 5 from below and is provided with a reduced stem 10 which extends up through the flange 7 and is provided with one or more spiral grooves 11 which engage pins or projections 12 on the flange 7, thus causing the plug to rotate as it moves longitudinally, giving said plug a spiral motion. The grooves 11 each make but a quarter turn around said stem and the pins 12 are so placed that when the plug is in its extreme elevated position, as shown in Fig. 1, the port 9 is at right angles to bore 1, and when the plug is in its extreme depressed position, as shown in Fig. 2, the port 9 registers with said bore 1.

The plug 8 is provided near its upper end with a circumferential groove 13 in which is seated a gasket or packing 14 of similar material which contacts with the valve seats and prevents the upward escape of water.

The outer or upper end of stem 10 is provided with a swiveled cap 15 which does not turn with the plug and stem and which limits the downward movement of the plug, thus at all times maintaining a chamber between the lower end of the plug and the bottom of valve seat 5.

A passage 16 leads from the bore 4 to the bottom of valve seat 5, thereby maintaining water pressure under the valve plug 8.

The operation of our device is as follows: Normally the valve plug 8 is maintained in its elevated position, as shown in Fig. 1, by the water-pressure beneath said plug, thus closing the bore 1 and entirely preventing the passage of water along the same. To open the nozzle, the operator presses his finger upon the cap 15, depressing the plug 8 against the water-pressure beneath the same. If the plug be depressed to its lowermost position, the port 9 will exactly register with the bore 1 through the spiral movement of the plug, thus allowing the water to escape through bore 1 at full pressure. A partial depression of the plug will result in but a partial registration of the port 9 with the bore 1 and result in a spraying effect. The character of the spray may be nicely regulated by the amount of depression given to the valve plug. A cessation of pressure on the upper end of the stem will at once result in the water-pressure beneath the plug forcing the same upward and shutting off the nozzle completely.

It is evident from the above that our nozzle is of especial value for use where but one hand can be given to handling the hose, as, for instance, in the washing of vehicles. The hose may be dropped when not needed, the nozzle at once automatically closing and preventing the escape of water until it is picked up and the finger of the operator applied to the cap on the end of the stem. This prevents waste of water and greatly expedites the work. The nozzle is also non-intensive, since the manner of closing the same prevents the sudden rise in pressure in the hose when the nozzle is closed. It is well known that if a nozzle is suddenly and completely closed, the hose pressure rises immediately for the time being, frequently resulting in the bursting of the hose.

The construction of our device is very simple and inexpensive; it contains but few parts and these are too substantial to quickly wear out or break, no springs or other unreliable elements being used, and the device may be taken apart or put together in a moment.

What we desire to claim is:—

1. A hose-nozzle provided with a longitudinal bore, a valve seat open at one end intersecting said bore, and a passage leading from the butt end of said bore into the bottom of said valve seat; a valve plug mounted in said valve seat and provided with a transverse port adapted to register with said bore when said plug is pressed down in said seat, and coacting elements on said valve seat whereby said valve plug is capable of a spiral movement.

2. A hose-nozzle provided with a longitudinal bore, a valve seat open at one end and intersecting said bore, a passage leading from the butt end of said bore into the bottom of said valve seat, a valve plug slidably mounted in said valve seat and having a transverse port adapted to register with said bore when in its innermost position, a protruding stem for said valve plug having a spiral groove, and a pin extending into said valve seat and engaging said groove whereby said valve plug is caused to move spirally.

3. A hose-nozzle provided with a longitudinal bore, a valve seat intersecting said bore and having one of its ends open and of reduced diameter while its other end is closed by a removable plug, a passage connecting the butt end of said bore with the closed end of said passage, a valve-plug mounted in said valve seat and capable of sliding longitudinally therein and having a transverse port adapted to register with said bore when said plug is at its innermost position, a reduced stem for said plug protruding through the reduced end of said valve seat and provided with a spiral groove, and a projection extending from the wall of said valve seat and engaging said groove, for the purpose described.

Signed at Pittsburgh, Penna., this 19th day of September, 1912.

WILLIAM O'BRIEN.
FRED. W. WADDELL.

Witnesses:
W. W. STONER,
RAPHAEL FRANK.